Oct. 21, 1941.     R. R. AMESBURY     2,259,720
NUT AND NUT ASSEMBLY
Filed Sept. 1, 1939

Inventor:
Robert R. Amesbury.
By John Todd
Att'y

Patented Oct. 21, 1941

2,259,720

UNITED STATES PATENT OFFICE 2,259,720

NUT AND NUT ASSEMBLY

Robert R. Amesbury, Auburndale, Mass., assignor to United-Carr Fastener Corporation, Cambridge, Mass., a corporation of Massachusetts Application September 1, 1939, Serial No. 293,045

4 Claims. (Cl. 85—32)

This invention relates to improvements in nut members of the type adapted to be secured in engagement with a supporting panel from a position entirely on one side of the panel.

The chief object of my invention is a nut member of simple construction comprising a threaded shank portion having yieldable shouldered legs adapted to be moved axially through an opening of the support to snap into fastened engagement with the support to secure said nut member in assembly therewith.

Another object of my invention is the provision of a nut having a shank adapted to be snapped into engagement with a support through an opening in the support so as to be initially assembled therewith, the shank being tapered at its free end whereby a screw means threaded through the same causes the shank to be expanded into locking engagement with the support.

Other objects and uses of my invention will be apparent from inspection of the drawing and specification hereinbelow set forth.

Referring to the drawing, in which I have illustrated a preferred embodiment of my invention:

Figure 1:
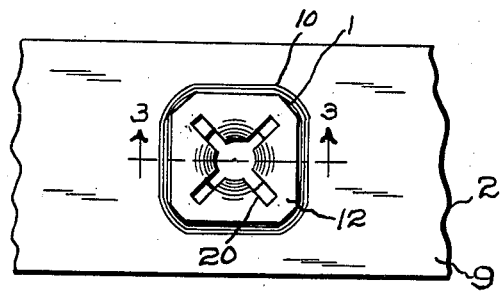
Fig. 1 is a top plan view of a supporting panel with one of my improved nut members assembled therewith.
Figure 2:
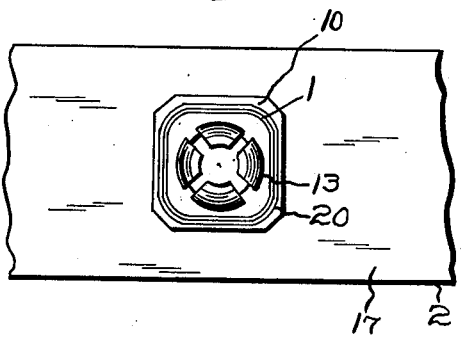
Fig. 2 is a bottom plan view of the installation shown in Fig. 1.
Figure 3:
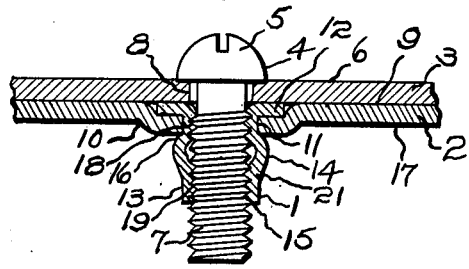
Fig. 3 is a sectional view along the line 3—3 of Fig. 1 showing the manner in which a screw cooperates with the nut member to secure another part to the supporting panel.
Figure 4:
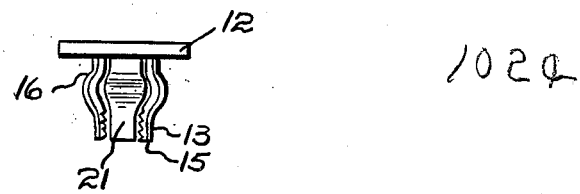
Fig. 4 is a front view of my improved nut member per se.

Referring in detail to the preferred installation of my improved nut member, as most clearly shown in Fig. 3, I have shown a nut member 1 secured in fastened engagement with a supporting panel 2 and another part such as a plate member 3 secured in superposed relation to the panel 2 through means of a screw means 4 having a head 5 engaging an outer surface 6 of the plate 3 and a threaded shank 7 extending through an opening 8 of the plate 3 into cooperative threaded engagement with the nut member 1. The nut member 1 has a base or flange means engaging the outer surface 9 of the support 2 within an embossment 10 and an internally threaded shank portion extending from the base portion and entered into snap fastener engagement with the support 2 through an opening 11 of the support. The shank portion preferably tapers slightly toward its free end for a purpose to be described.

Figures 5, 6, 7:
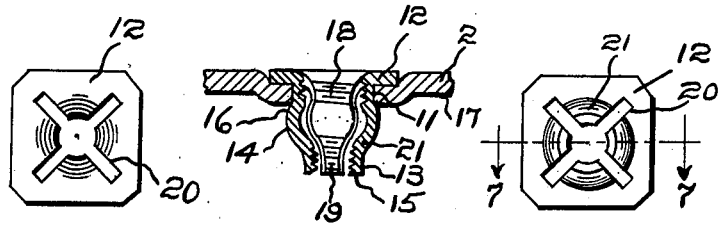
Fig. 5 is a top view of the nut member shown in Fig. 4.
Fig. 6 is a bottom view of the nut member shown in Figs 4 and 5.
Fig. 7 is a sectional view of the nut member taken along the line 7—7 of Fig. 6 and showing the nut member secured in initial assembly with the support and in position to receive a screw means.

Referring in detail to the specific construction of the nut member 1, I have shown one which, in my preferred form, has a base 12 preferably of non-circular shape to cooperate with the similarly-shaped embossment 10 of the supporting panel to prevent relative rotation of the parts during threading of the screw into the nut. A shank portion 13 is pressed from the base 12 and extends outwardly in substantially right-angular relation thereto. The shank 13 has a laterally projecting means in the form of a peripheral bead 14 pressed outwardly from the shank intermediate its junction with the base 12 and its outermost end 15. The function of the bead 14 is most clearly shown from inspection of Fig. 3 wherein the surfaces 16 of the bead which face the base 12 serve as shoulders for engagement behind the lower surface 17 of the panel 2 to secure the nut member against unintentional axial withdrawal. The shank 13 is internally threaded adjacent the base 12 as at 18 (Figs. 3 and 7) and adjacent its end 15 as at 19. In my preferred form the diameter of the threaded portion 18 is the proper size for a designated screw, but the diameter of the threaded portion 19 is less than that of the screw with the result that the shank is expanded during threading of the screw therethrough. The inner surface of the shank at the bead 14 is disposed laterally beyond the path of the shank 7 of the screw through the nut and hence may be left unthreaded. The shank 13 has a plurality of slots 20 which preferably extend from its outermost end 15 through its entire length and into the base 12 thereby dividing the shank into a plurality of yieldable legs 21. In my preferred form I have provided two pairs of legs with the legs of each pair in spaced opposite relation so that the legs cooperate with the shank 7 of the screw when the shank is entered therebetween. Thus it will be seen that by forming the slots 20 in the nut shank 13, the shank is made resilient, without destroying its effectiveness for threaded engagement with the screw shank, so as to enable the nut shank to be snapped into engagement with the supporting panel through the opening 11. It will be noticed that by threading the shank at two portions along its length, as at 18 and 19, a good threaded engagement is effected between the screw shank and the nut member. It should be understood, however, that a satisfactory nut member for many purposes would be provided if the shank were to be threaded adjacent one of its ends only.

Initial attachment of the nut member to the panel 2 is a relatively simple matter and may be carried out by hand through moving the shank 13 through the opening 11 of the support thereby causing the legs 21 to contract until the shoulders 16 have passed through the support, at which time the legs expand to engage the shoulders 16 behind the surface 17 of the support. When the screw member 4 for securing the plate 3 to the support enters threading engagement with the threads 19 of the nut shank, the legs 13 are expanded thereby moving the shoulders 16 into locking engagement with the supporting panel, as shown in Fig. 3. As a result of this action the nut member is locked in assembly with the supporting panel and an inexpensive, secure fastening is effected.

Although I have illustrated and described a preferred embodiment of my invention, I do not wish to be limited thereby because the scope of my invention is best defined in the following claims.

I claim:

1. A nut member having a base, a hollow internally threaded shank extending from said base for receiving a screw member, said shank having an exterior annular bead intermediate said base and the outer end of said shank, said bead providing a complementary recess on the interior of said shank, and said shank having a plurality of slots extending from adjacent its free end toward said base and dividing said shank into a plurality of resilient threaded legs each of which has a portion of said bead and complementary recess, and said bead portions acting as shoulders whereby said shank may be snapped into engagement with a support through an aperture thereof.

2. A nut member having a base, a hollow resilient shank extending from said base and adapted to be positioned within an aperture of a supporting part, said shank having a single thickness of material and the material of said shank being of substantially the same thickness throughout its length, said shank being internally threaded for co-engagement with a screw member inserted therethrough, said shank having bulged portions providing laterally projecting shoulder means on the exterior of said shank, said bulged portions providing complementary recesses on the interior of said shank, and the inside diameter of said shank at a portion thereof being less than said screw member whereby movement of said screw through said shank expands said shoulder means to lock behind said support.

3. A nut member having a base, a hollow resilient shank extending from said base, said shank having a single thickness of material and said thickness of material being substantially the same throughout the length of said shank, said shank being internally threaded adjacent its free end for co-engagement with a screw means inserted therethrough, said shank having bulged portions providing shoulders on the exterior of said shank intermediate its ends whereby it may be snapped into fastened engagement with a support through an aperture thereof, said bulged portions providing complementary recesses on the interior of said shank, and the inside diameter of said shank through said threaded portion being less than said screw whereby threaded engagement of said screw with said shank expands said shoulders to lock behind said support.

4. A nut member having a base, a hollow internally threaded shank extending from said base for receiving a screw member, said shank tapering toward its outer end, said shank having an annular bead intermediate said base and the outer end of said shank, said bead providing an annular bead-like formation on the exterior of said shank and a complementary annular depression on the interior of said shank, said shank having a plurality of slots extending from adjacent its free end toward said base and dividing said shank into a plurality of legs, each of which has a portion of said bead, portions of the interior surface of said legs being threaded and said legs being threadless at said depression, and said bead portions acting as shoulders whereby said shank may be snapped into engagement with a support through an aperture thereof.

ROBERT R. AMESBURY.